United States Patent

Parker et al.

[11] Patent Number: 6,003,815
[45] Date of Patent: Dec. 21, 1999

[54] PARACHUTES

[75] Inventors: Nigel Stuart Parker, South Glamorgan; David Richard Jordan Hirst, Mid Glamorgan, both of United Kingdom

[73] Assignee: Wardle Storeys (Safety & Survival Equipment) Limited, Lancashire, United Kingdom

[21] Appl. No.: 09/030,444

[22] Filed: Feb. 25, 1998

[51] Int. Cl.⁶ .................................................. B64D 17/02
[52] U.S. Cl. ........................... 244/142; 244/145; 244/149
[58] Field of Search .................................... 244/142, 145, 244/149

[56] References Cited

U.S. PATENT DOCUMENTS

| | | | |
|---|---|---|---|
| 1,509,410 | 9/1924 | Ruff | 244/142 |
| 2,403,832 | 7/1946 | Smith | 244/149 |
| 2,418,456 | 4/1947 | Boland | 244/142 |
| 3,110,459 | 11/1963 | Heinrich | 244/149 |
| 3,420,478 | 1/1969 | Ferguson | 244/142 |
| 4,586,685 | 5/1986 | Kostelezky | 244/145 |
| 5,388,787 | 2/1995 | Webb et al. | 244/142 |

*Primary Examiner*—Charles T. Jordan
*Assistant Examiner*—Vagnola Khamvongsa Comer

[57] ABSTRACT

A reserve parachute is provided with air pockets at the apex of the canopy to allow rapid deployment of the reserve parachute without tangling with a malfunctioning main parachute. Skirt assist lines are provided to allow the lower edge of the canopy to spread on deployment and thus speed the opening of the canopy. In addition, ties may be provided between the pockets to maximize their effectiveness.

5 Claims, 2 Drawing Sheets

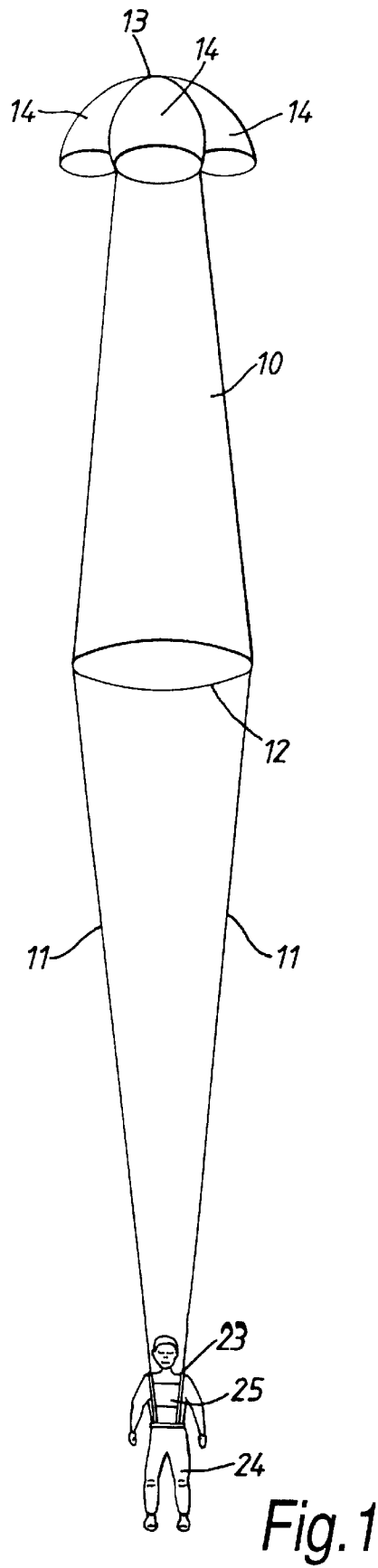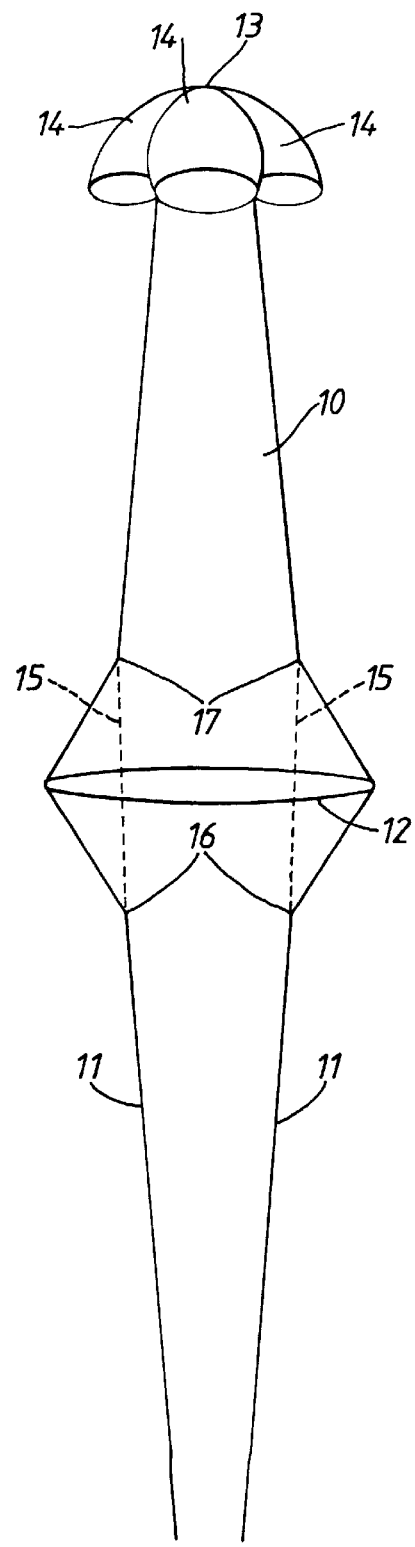

1

PARACHUTES

BACKGROUND TO THE INVENTION

1. Field of the Invention

The invention relates to parachutes and in particular to reserve parachutes.

2. Description of Related Art

Where a parachute is used to support a person, a reserve parachute is provided for use in the event that the main parachute does not deploy or does not deploy successfully. In general, where a reserve parachute is deployed, it is essential that the reserve parachute deploys very quickly. This is particularly true where the main parachute is being used for low level dropping.

There are a number of factors that mitigate against the rapid and successful opening of a reserve parachute in these circumstances. First, a pilot parachute cannot be used to promote rapid deployment of the reserve parachute as such pilot parachutes tend to fly up inside the malfunctioning main parachute causing a persisting entanglement between the reserve parachute and the main parachute. Secondly, the air flow regime in such circumstances may not be conducive to rapid deployment of the reserve parachute.

SUMMARY OF THE INVENTION

According to the invention, there is provided a reserve parachute comprising a conical canopy having an apex and a lower edge, the apex including a plurality of pockets which inflate on release of the canopy to deploy the canopy.

The use of pockets at the apex has been found to create a positive force to control the deployment while avoiding entanglements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following is a more detailed description of some embodiments of the invention, by way of example, reference being made to the accompanying drawing in which:

FIG. 1 is a diagrammatic view of a reserve parachute following deployment but before inflation and showing air pockets at an apex of a canopy of the parachute in an inflated condition, FIG. 2 is a similar view to FIG. 1 but showing the use of skirt assist lines between rigging lines of the parachute and an interior of the canopy.

DESCRIPTION OF THE PREFERRED EMBODIMENTS

Figure 3:
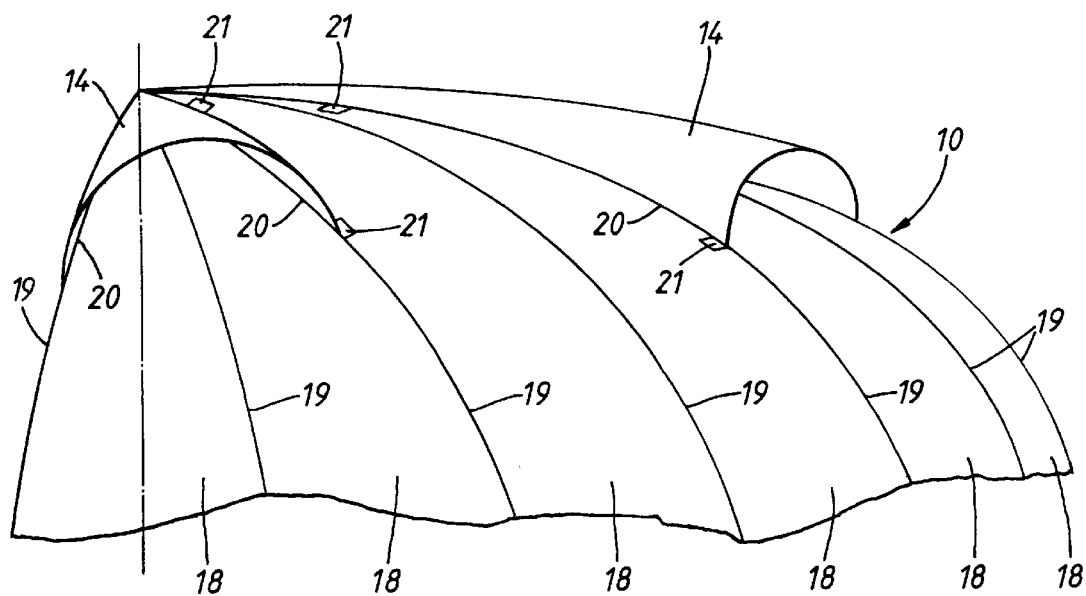
FIG. 3 is a schematic view of a part of the canopy of the reserve parachute of FIGS. 1 and 2 showing an alternative arrangement of air pockets and the location point for break ties.

Referring first to FIG. 1, the reserve parachute comprises a canopy indicated diagrammatically at 10 connected by rigging lines, some of which are shown at 11, to a harness 23 for attachment to a parachutist 24. The canopy 10 may be of any suitable construction but both the canopy 10 and the rigging lines 11 are preferably made from lightweight materials; for example, the complete weight of the parachute may be less than 4 kg.

The canopy 10 has a lower edge 12 and an apex 13. The apex is provided with four air pockets 14 which extend continuously around the apex over three gores with two plain gores in between. Of course, there may be more or less than four air pockets.

In use, the reserve parachute is carried with the main parachute (shown packed at 25) by the parachutist 24. If the main parachute 25 malfunctions either by a failure to deploy or by incorrect deployment, the parachutist 24 activates the reserve parachute. As the reserve parachute enters the air stream, the air pockets 14 inflate rapidly to create a positive force that controls the deployment of the reserve parachute by lifting it out of the container and aligning it with the air flow. They act in a similar manner to a pilot chute. The fact that the air pockets 14 are on the canopy means that any tendency of the air pockets to entangle with the malfunctioning main parachute is avoided.

The rapidity of the deployment is also assisted by the fact that the canopy 10 and rigging lines 11 are of light weight.

Referring next to FIG. 2, parts common to FIG. 1 and FIG. 2 will be given the same reference numerals and will not be described in detail.

The reserve parachute of FIG. 2 is provided with skirt assist lines 15. Each skirt assist line 15 is connected between a rigging line 11 and the canopy 10. The connection is between a point 16 on the rigging line adjacent the lower edge 12 of the canopy and a point 17 on the interior of the canopy 10 spaced from the lower edge 12. The length of each skirt assist line 15 is less than the distance between the points 16,17 along the associated rigging line 11 and along the canopy 10.

The effect of this is that, when the canopy is deployed, the edge of the canopy 10 between the lower edge 12 and the point 17 of connection of the skirt assist lines 15 on the canopy 10 is relieved from tension. This allows this portion of the canopy 10 to move outwardly rapidly in the air flow to promote fast inflation of the canopy. This is particularly advantageous when deployment is at low level.

Referring next to FIG. 3, this shows an alternative arrangement of the canopy 10 of the reserve parachute from the air pockets 14. As seen in this figure, the canopy is formed from a plurality of generally triangular gores 18. The gores are connected at their apexes and stitched together along their side edges 19 leading to the apexes. Alternate pairs of gores 18 are covered by air pockets 14. Each air pocket 14 is generally triangular with an apex connected at the apex of the canopy 10 and side edges 20 connected along the outer side edges 19 of the two gores 18 spanned by each air pocket 14.

Two break ties 21 are provided between the adjacent side edges 20 of each pair of pockets 14. One break tie 21 extends between two points adjacent the lower edges of the adjacent side edges 20 and one break tie 21 extends between two points on the side edges 20 towards the apexes of the air pockets 14.

The purpose of these break ties 21 is to close the gores 18 between the pockets 14 during packing so that the air pockets 14 are substantially continuous around the apex of the canopy 10 when the reserve parachute is first deployed. This gives the air pockets 14 maximum effectiveness on deployment. As the canopy 10 inflates, the ties 21 break (as shown) to allow full deployment of the canopy.

It will be appreciated that the reserve parachutes described above with reference to the drawings provide a canopy which deploys accurately in the airstream without entangling with a malfunctioning main parachute and then opens quickly. This allows the reserve parachute to be used reliably at low altitudes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A parachute in combination with a reserve parachute, said reserve parachute comprising a conical canopy having an apex and a lower edge, the apex including a plurality of pockets which inflate on release of the canopy to deploy the canopy.

2. The parachute in combination with the reserve parachute according to claim 1 wherein the canopy is formed from a plurality of gores, each pocket spanning at least one gore.

3. The parachute in combination with the reserve parachute according to claim 2 wherein each pocket comprises a generally triangular piece of material with an apex thereof at the apex of the canopy and with the side edges thereof leading to the apex connected to the canopy along lines lying in respective planes including the canopy axis.

4. The parachute in combination with the reserve parachute according to claim 2 wherein each pocket is separated from the next adjacent pocket by at least two gores, said gores on deployment, being connected by ties which break as the canopy inflates to allow the canopy to deploy fully.

5. The parachute in combination with the reserve parachute according to claim 1 wherein the canopy is connected to a harness by rigging lines, additional lines being connected between a point on each rigging line adjacent the lower edge of the canopy and a point on an interior of the canopy spaced towards the apex from said lower edge, the length of each said additional line being less than the length between the associated said points along the associated rigging line and canopy, so that the canopy between the point on the interior of the canopy spaced towards the apex and the lower edge is free to spread to promote inflation of the canopy.

* * * * *

UNITED STATES PATENT AND TRADEMARK OFFICE
CERTIFICATE OF CORRECTION

PATENT NO. : 6,003,815
DATED : December 21, 1999
INVENTOR(S) : Parker et al.

It is certified that error appears in the above-identified patent and that said Letters Patent is hereby corrected as shown below:

On the Title Page, insert item

-- [30] Foreign Application Priority Data
March 1, 1997 [GB] United Kingdom 9704289.9 --

Signed and Sealed this

Sixth Day of February, 2001

Attest:

Q. TODD DICKINSON

Attesting Officer

Director of Patents and Trademarks